US012587930B2

(12) United States Patent (10) Patent No.: US 12,587,930 B2
Nakayama et al. (45) Date of Patent: Mar. 24, 2026

(54) COMMUNICATION SYSTEM, CONNECTION DESTINATION CONTROL METHOD, CONTROL APPARATUS AND PROGRAM

(71) Applicant: NTT, Inc., Tokyo (JP)

(72) Inventors: Shota Nakayama, Musashino (JP);
Daisuke Murayama, Musashino (JP);
Kenichi Kawamura, Musashino (JP);
Takatsune Moriyama, Musashino (JP)

(73) Assignee: NTT, Inc., Tokyo (JP)

( * ) Notice: Subject to any disclaimer, the term of this patent is extended or adjusted under 35 U.S.C. 154(b) by 581 days.

(21) Appl. No.: 18/016,248

(22) PCT Filed: Jul. 27, 2020

(86) PCT No.: PCT/JP2020/028756
§ 371 (c)(1),
(2) Date: Jan. 13, 2023

(87) PCT Pub. No.: WO2022/024196
PCT Pub. Date: Feb. 3, 2022

(65) Prior Publication Data
US 2023/0276335 A1 Aug. 31, 2023

(51) Int. Cl.
*H04W 36/00* (2009.01)
*H04W 36/30* (2009.01)
*H04W 36/32* (2009.01)

(52) U.S. Cl.
CPC ....... *H04W 36/302* (2023.05); *H04W 36/322* (2023.05)

(58) Field of Classification Search
CPC ............. H04W 36/302; H04W 36/322; H04W 36/00835; H04W 64/00
(Continued)

(56) References Cited

U.S. PATENT DOCUMENTS 5,805,999 A * 9/1998 Inoue .................... H04M 1/727
455/435.2
5,852,770 A * 12/1998 Kasamatsu .......... H03G 3/3047
330/129
(Continued)

FOREIGN PATENT DOCUMENTS

JP 2009182401 8/2009
JP 2019022089 2/2019

OTHER PUBLICATIONS

[No Author Listed], "4 Architecture model and concepts," 3GPP TS 23.501 V16.4.0 (Release 16), Mar. 2020, 430 pages.

*Primary Examiner* — Amancio Gonzalez
(74) *Attorney, Agent, or Firm* — Fish & Richardson P.C.

(57) ABSTRACT

A communication system includes a terminal configured to wirelessly communicate with a base station and a control device. The terminal includes a transmission unit that transmits location information of the terminal. The control device includes a processor; and a memory that includes instructions, which when executed, cause the processor to execute the following steps: setting an area around a dead zone as a preliminary dead area, acquiring location information of the terminal, and determining whether the terminal is in the preliminary dead area by comparing the location information of the terminal with the preliminary dead area and performing control for switching a connection destination of the terminal when the determining determines that the terminal is in the preliminary dead area.

8 Claims, 15 Drawing Sheets

(58) Field of Classification Search
USPC ......................................................... 455/436
See application file for complete search history.

(56)                     References Cited

U.S. PATENT DOCUMENTS

| | | | | |
|---|---|---|---|---|
| 6,132,306 | A * | 10/2000 | Trompower .......... | H04L 1/0038 |
| | | | | 455/450 |
| 6,493,561 | B1 * | 12/2002 | Hasegawa ............. | H04W 48/20 |
| | | | | 455/512 |
| 6,597,906 | B1 * | 7/2003 | Van Leeuwen ..... | H04W 64/006 |
| | | | | 455/436 |
| 6,650,896 | B1 * | 11/2003 | Haymes ............. | G01C 21/3461 |
| | | | | 455/446 |
| 6,681,112 | B1 * | 1/2004 | Schwarz .............. | H04W 36/06 |
| | | | | 455/436 |
| 6,721,572 | B1 * | 4/2004 | Smith .................. | H04W 76/19 |
| | | | | 370/328 |
| 8,195,122 | B1 * | 6/2012 | Kahn ................ | H04W 52/0241 |
| | | | | 455/404.2 |
| 8,995,988 | B2 * | 3/2015 | Shibayama ........... | H04W 16/18 |
| | | | | 455/446 |
| 9,020,536 | B1 * | 4/2015 | Crossno ............. | G06Q 10/0833 |
| | | | | 455/67.11 |
| 9,100,838 | B2 * | 8/2015 | Lundquist ............. | H04W 16/18 |
| 9,264,934 | B2 * | 2/2016 | Gavita .............. | H04W 28/0268 |
| 10,154,443 | B2 * | 12/2018 | Walley ................ | H04W 36/023 |
| 10,602,312 | B2 * | 3/2020 | Tsuchida ............. | H04L 67/5681 |
| 10,645,588 | B2 * | 5/2020 | Mahoney .............. | H04W 24/02 |
| 11,323,949 | B2 * | 5/2022 | Juhasz ............. | H04M 1/72463 |
| 11,540,144 | B2 * | 12/2022 | Makati .................. | H04W 16/26 |
| 11,562,499 | B2 * | 1/2023 | Shamir .................. | G06F 3/011 |
| 11,783,317 | B2 * | 10/2023 | Yan .................... | G06Q 20/3224 |
| | | | | 705/26.1 |
| 11,929,802 | B2 * | 3/2024 | Xue ........................ | H01Q 19/18 |
| 2008/0108330 | A1 * | 5/2008 | O'Neil ................... | H04W 8/08 |
| | | | | 455/414.1 |
| 2012/0190380 | A1 * | 7/2012 | Dupray ................ | G01S 5/0278 |
| | | | | 455/456.1 |
| 2019/0373419 | A1 * | 12/2019 | Bayley ..................... | G08G 1/22 |
| 2020/0187083 | A1 | 6/2020 | Shimizu et al. | |
| 2021/0068034 | A1 * | 3/2021 | Juhasz ................. | H04W 4/029 |

* cited by examiner

Fig. 11

| DETECTION POINT | DETECTION POSITION | DEAD ZONE |
|---|---|---|
| DEAD POINT 1 | (p,q) | (p−R~p+R,q−R~q+R) |
| DEAD POINT 2 | (r,s) | (r−R~r+R,s−R~s+R) |
| DEAD POINT 3 | (t,u) | (t−R~t+R,u−R~u+R) |

⋮

COMMUNICATION SYSTEM, CONNECTION DESTINATION CONTROL METHOD, CONTROL APPARATUS AND PROGRAM

CROSS-REFERENCE TO RELATED APPLICATIONS

This application is a National Stage application under 35 U.S.C. § 371 of International Application No. PCT/JP2020/028756, having an International Filing Date of Jul. 27, 2020.

The disclosure of the prior application is considered part of the disclosure of this application, and is incorporated by reference in its entirety into this application.

TECHNICAL FIELD

The present invention relates to a technology for avoiding deterioration in communication quality and communication interruption in a wireless communication system.

BACKGROUND ART

In 3GPP, standardization of a wireless communication system called 5G (for example, NPL 1) has progressed and 5G communication services have been started. Local 5G (L5G), which is a local 5G system constructed by companies and local governments, has also been studied and introduced.

5G has characteristics of ultrahigh speed, ultralow latency, and multiple concurrent connections and is expected to be used for various wireless accesses. In particular, in L5G, utilization of applications critical for missions is also assumed, and maintenance of communication quality is more strictly required. Since the introduction cost of L5G is higher than that of other radio systems (a wireless LAN and the like), it is assumed that L5G will be introduced, while limiting an area, for example, by limiting the number of base stations.

CITATION LIST

Non Patent Literature

[NPL 1] 3GPP TS 23.501 V16.4.0 (2020-03) (Release 16), "4 Architecture model and concepts"

SUMMARY OF INVENTION

Technical Problem

For 5G, frequencies of a 3.7 GHz band, a 4.5 GHz band, and a 28 GHz band are utilized. For L5G, frequencies of a 4.5 GHz band and a 28 GHz band are utilized.

However, in a high-frequency band such as a millimeter-wave band (28.2 to 29.1 GHz), radio waves highly tend to travel linearly, and, thus, areas or dead zones may occur where it is difficult for radio waves to reach due to blocking objects or columns of buildings. When a terminal (UE) enters an area or a dead zone where it is difficult for radio waves to reach, deterioration in communication quality (including communication interruption) may occur in some cases.

The present invention has been made in view of the above-described point, and an object is to provide a technology for avoiding deterioration in communication quality caused by a terminal entering a dead zone in a wireless communication system.

Solution to Problem

According to the disclosed technology, there is provided a communication system including a terminal configured to wirelessly communicate with a base station: and a control device. The terminal includes a transmission unit that transmits location information of the terminal. The control device includes a preliminary dead area setting unit that sets an area around a dead zone as a preliminary dead area, an information collection unit that acquires location information of the terminal, and a connection destination control unit that determines whether the terminal is in the preliminary dead area by comparing the location information of the terminal with the preliminary dead area and performs control for switching a connection destination of the terminal when the connection destination control unit determines that the terminal is in the preliminary dead area.

Advantageous Effects of Invention

According to the disclosed technology, a technology can be provided that is for avoiding deterioration in communication quality caused by a terminal entering a dead zone in a wireless communication system.

BRIEF DESCRIPTION OF DRAWINGS

FIG. 6 is a flowchart illustrating a method of detecting entry to a preliminary dead area entry and the like.
FIG. 11 is a diagram illustrating an example of a DB that stores dead zone information.

DESCRIPTION OF EMBODIMENTS

Hereinafter, an embodiment of the present invention (the present embodiment) will be described with reference to the drawings. The embodiment described below is merely an example, and an embodiment to which the present invention is applied is not limited to the following embodiment.

In the present embodiment, a "dead zone" is an area where radio waves rarely arrive from a base station. An "area where radio waves rarely arrive" is, for example, an area where only radio waves with power equal to or less than a certain threshold arrive (including an area where radio waves do not arrive at all). In the following description, a terminal is described as UE. UE is an abbreviation for user equipment.

Problem and Overview of Embodiment

First, an operation in a case where a technology according to the present embodiment is not applied will be described with reference to FIG. 1 and FIG. 2.

Figure 1:
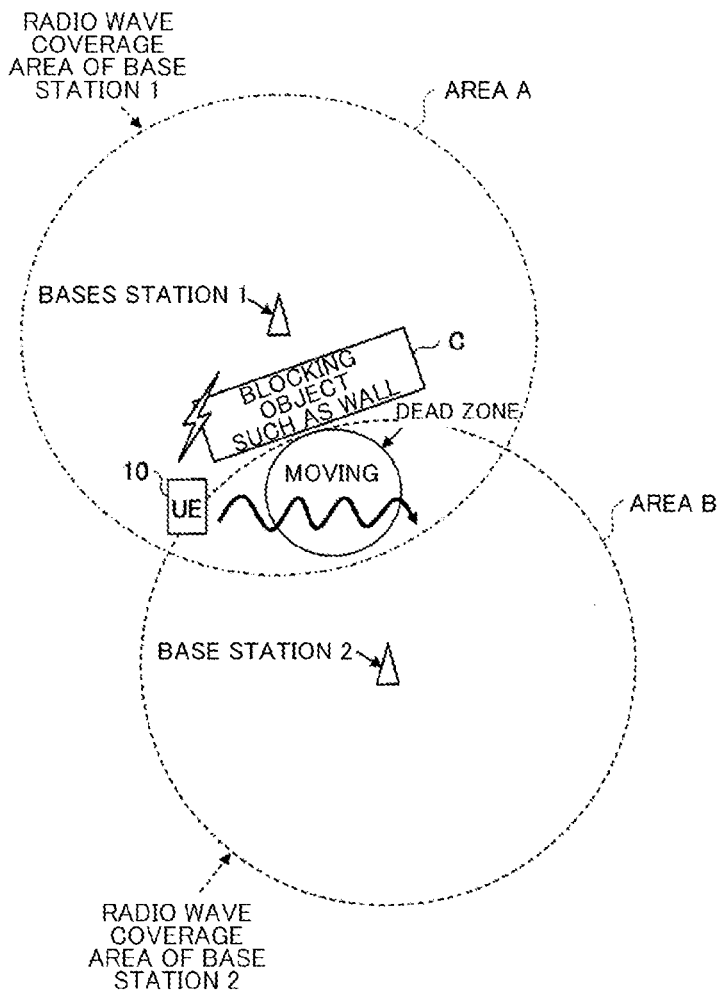
FIG. 1 is a diagram illustrating a problem.

As illustrated in FIG. 1, there are a base station 1 and a base station 2, and respective radio wave coverage areas are illustrated as areas A and B. In the state illustrated in FIG. 1, the UE 10 is connected to the base station 1. A blocking object C such as a wall is located at a position illustrated in the drawing, and an area behind the blocking object C when viewed from the base station 1 is a dead zone.

Figure 2:
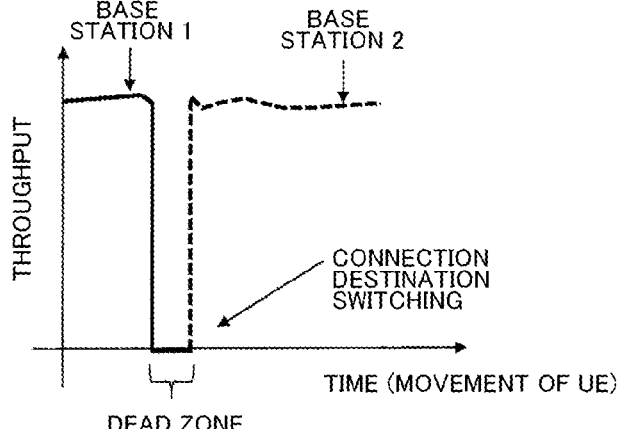
FIG. 2 is a diagram illustrating a problem.

FIG. 2 illustrates a change in communication quality (for example, a throughput in the UE 10) when the UE 10 passes through the dead zone and moves to the area B in such an environment. As illustrated in FIG. 2, the throughput becomes 0 for a period in which the UE 10 passes through the dead zone.

In the present embodiment, to avoid deterioration in communication quality due to entry to the foregoing dead zone, a preliminary dead area is set around the dead zone. A control device 100 to be described below causes the UE 10 to switch connection to another line (another base station or the like) in advance or implement redundancy through connection of a plurality of lines by detecting entry of the UE 10 to the preliminary dead area. Hereinafter, the present embodiment will be described in more detail.

(System Configuration)

Figure 3:
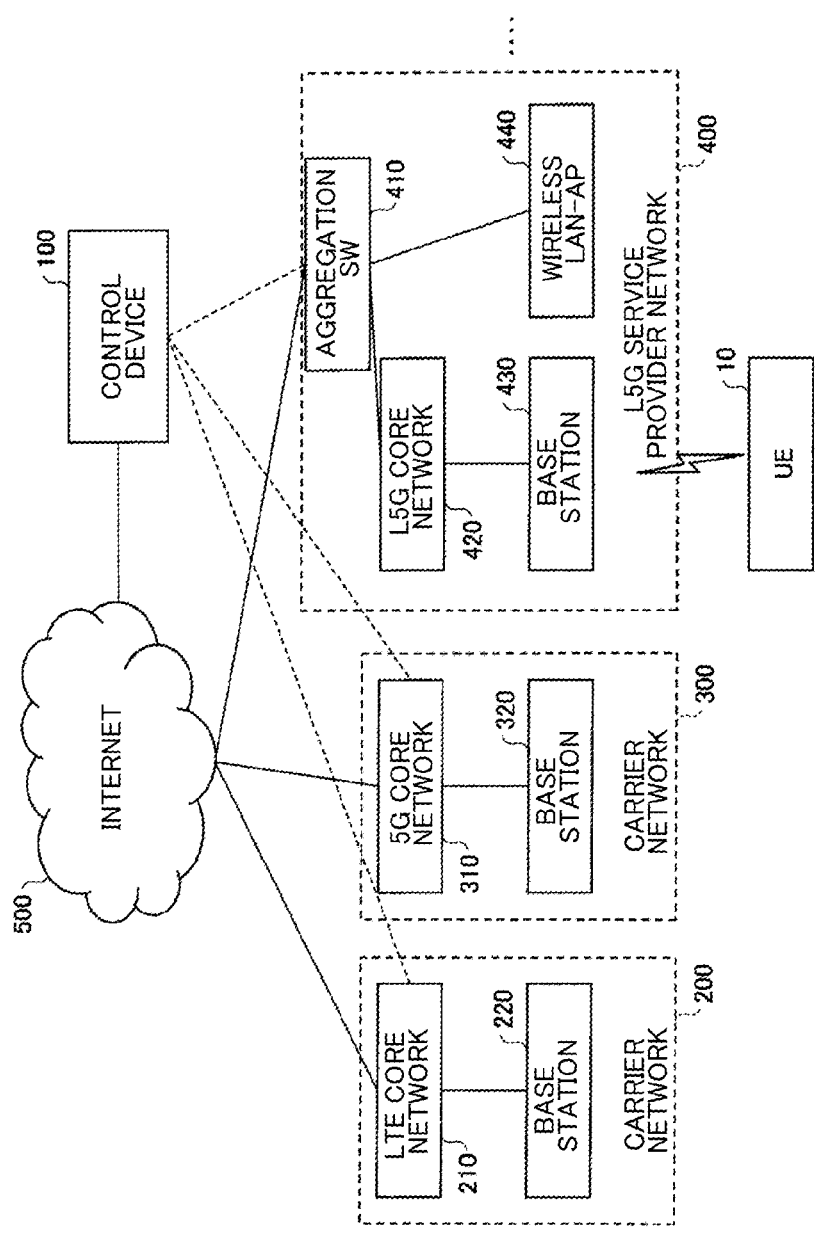
FIG. 3 is a diagram illustrating a configuration of a system according to an embodiment of the present invention.

FIG. 3 illustrates an example of an overall configuration of a communication system according to the present embodiment. As illustrated in FIG. 3, the system includes the control device 100, a carrier network 200, a carrier network 300, and an L5G service provider network 400, which are connected to the Internet 500. The UE 10 performs wireless communication with a base station 430 or the like of the L5G service provider network 400 depending on its position.

The carrier network 200 includes an LTE core network 210 and a base station 220. Only one base station is illustrated in each network in FIG. 3 to facilitate illustration. Actually, there can be many base stations.

The carrier network 300 includes a 5G core network 310 and a base station 320. The L5G service provider network 400 includes an aggregation SW 410, an L5G core network 420, the base station 430, and a wireless LAN-AP 440.

In any of the carrier network 200, the carrier network 300, and the L5G service provider network 400, a plurality of wireless systems such as wireless LAN-AP and IoT terminals may be included in the network. FIG. 3 illustrates an example in which there is the wireless LAN-AP 440 in the L5G service provider network 400.

The control device 100 is a device that performs control processing according to the present invention, and is a virtual server provided on a cloud or a physical server provided on a physical network. A location at which the control device 100 is deployed is not limited to a specific location, but the location may be determined in accordance with a control range. For example, when it is assumed that the UE 10 connected to the L5G service provider network 400 is to be controlled, the control device 100 may be installed at a location close to the L5G service provider network 400.

Information from the UE 10 is transmitted to the control device 100 via the wireless systems (LTE, 5G, L5G, a wireless LAN, an IoT terminal, or the like) of a connection destination.

(Overview of Operation)

Figure 4:
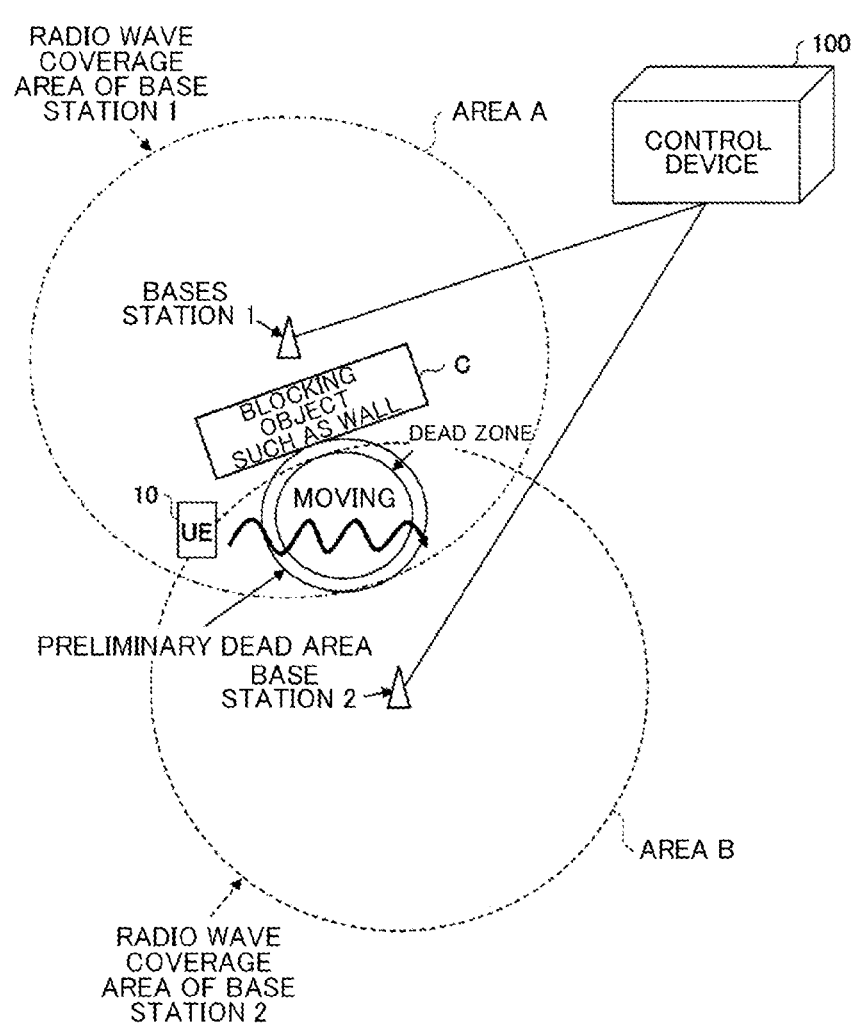
FIG. 4 is a diagram illustrating an overview of an operation of the system according to an embodiment of the present invention.
Figure 5:
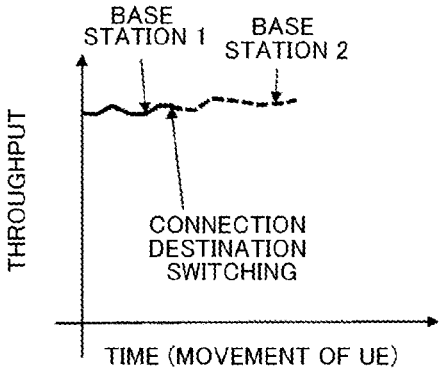
FIG. 5 is a diagram illustrating an overview of an operation of the system according to an embodiment of the present invention.

An overview of an operation of the system according to the embodiment will be described with reference to FIG. 4 and FIG. 5. In FIG. 4, there are the base station 1 and the base station 2, and respective radio wave coverage areas are the area A and the area B as in FIG. 1. The blocking object C such as a wall is located at the depicted location, and an area behind the blocking object C when viewed from the base station 1 is a dead zone of the base station 1. Each of the base station 1 and the base station 2 may be a base station of any one of the carrier network 200, the carrier network 300 and the L5G operator network 500. Each of the base stations 1 and 2 may be a wireless LAN-AP.

In such an environment, the UE 10 passes through a dead zone from the area A, and moves to the area B.

In the present embodiment, as illustrated in FIG. 4, a preliminary dead area is set around the dead zone. The control device 100 determines whether the UE 10 has entered the preliminary dead area based on location information of the UE 10.

The control device 100 instructs, for example, the UE 10 to switch a line from the base station 1 to the base station 2 when the control device 100 determines that the UE 10 has entered the preliminary dead area. The control device 100 may instruct the UE 10 to make connection to both the base stations 1 and 2 and use a redundant line. The foregoing instruction to switch the line and use the redundant line may be given to the base station 1.

Since the UE 10 can communicate with the base station 2 before the entry to the dead zone through the instruction from the control device 100, deterioration in communication quality due to the dead zone with respect to the base station 1 can be avoided. Accordingly, as illustrated in FIG. 5, the connection destination can be switched from the base station 1 to the base station 2 without the deterioration in the communication quality.

(Method of Detecting Entry into Preliminary Dead Area)

Figure 6:
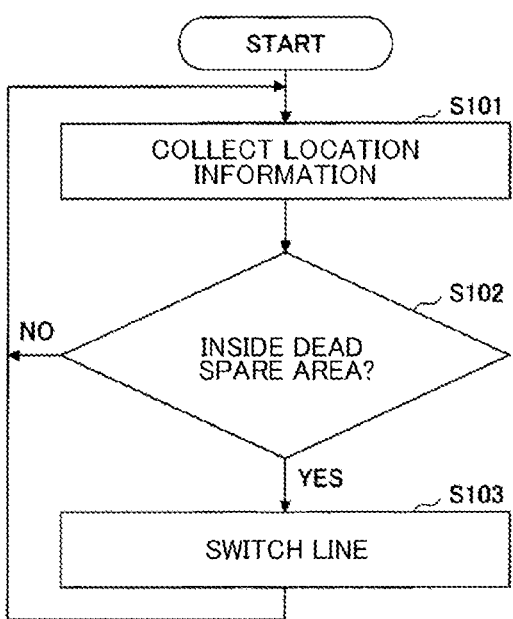

An example of details of processing of the control device 100 which detects the entry of the UE 10 into the preliminary dead area and performs line switching will be described more specifically along the procedure of the flowchart of FIG. 6.

Figure 7:
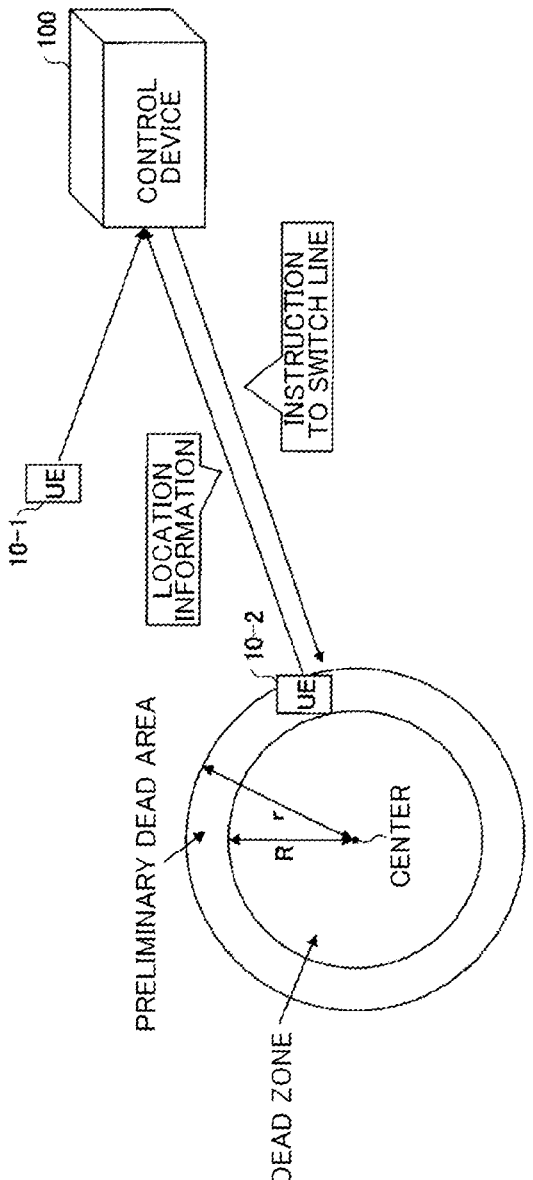
FIG. 7 is a diagram illustrating collection of location information.

FIG. 7 is also referred to as appropriate.

<S101>

In S101, the control device 100 periodically collects location information of the UE 10. In the present embodiment, it is assumed that a GPS device is installed in the UE 10 and location information obtained by the GPS device is transmitted from the UE 10 to the control device 100, but a method of collecting the location information is not limited to this method. For example, a sensor provided in the vicinity (a roadside or the like) of the UE 10 may acquire the location information of the UE 10 and transmit the location information to the control device 100.

The location information of the UE 10 collected by the control device 100 is, for example, x-y coordinates or latitude and longitude, but the location information is not limited thereto. The location information may be 3-dimensional location information including a height.

The control device 100 may collect location information of the UE 10 and atmospheric pressure sensor information at the position of the UE 10 (an atmospheric pressure at the position of the UE 10). The control device 100 can acquire a position in the height direction of the UE 10 in accordance with the atmospheric pressure sensor information. The position in the height direction can be used when the position of the UE 10 such as the case of the inside of a building is to be considered 3-dimensionally. The control device 100 may collect a velocity of the UE 10 and radio wave intensity from a base station at the UE 10 from the UE 10. The atmospheric pressure sensor information may be information regarding an atmospheric pressure sensor included in the UE 10 or information regarding an atmospheric pressure sensor provided in the vicinity of the UE 10.

<S102>

The control device 100 retains location information of a dead zone. As illustrated in FIG. 7, for example, when a certain dead zone is a circle with a radius R, the control device 100 sets a preliminary dead area with respect to the dead zone as a donut-shaped area obtained by excluding the dead zone (the circle with the radius R) from a circle with a radius R+r centered at the center of the dead zone. That is, the preliminary dead area is an area centered at the center of the bead zone and has a radius greater than or equal to the radius R and less than or equal to r. "r" may be determined in advance or may be determined dynamically in accordance with a velocity or the like of the UE 10.

In S102, the control device 100 compares a current position of the UE 10 acquired in S101 with a preliminary dead zone with respect to a dead zone in a base station to which the UE 10 is connected and determines whether the position of the UE 10 is inside the preliminary dead zone (that is, whether the UE 10 has entered the preliminary dead area). When it is determined that the UE 10 has entered the preliminary dead area, the processing proceeds to S103. In the foregoing comparison, the control device 100 also compares the current position of the UE 10 acquired in S101 with a preliminary dead area with respect to a dead zone in each base station in the vicinity of the base station to which the UE 10 is connected.

<S103>

In S103, the control device 100 transmits an instruction to switch a line to the UE 10 (or the base station to which the UE 10 is connected). As described above, an instruction to connect a redundant line may be given. The base station which is a connection destination of the line switching (or the redundant configuration) is assumed to be a base station for which the UE 10 is not located in the preliminary dead area among the nearby base stations.

When it is determined that the position of the UE 10 is inside the preliminary dead area of all the nearby base stations (all the nearby base stations to which the UE 10 can be connected), the control device 100 selects, from among the connected base station and all the nearby base stations, a base station such that a distance from the center of the preliminary dead zone corresponding to the preliminary dead area in which the UE 10 is located is the largest, and the control device 100 sets the base station as a connection destination of the UE 10.

When the UE 10 is located in the preliminary dead area in all the connectable base stations, the larger the distance between the center of the dead zone and the base station is, the smaller an influence of the dead zone is. Accordingly, the base station can be selected, as described above.

Figure 8:
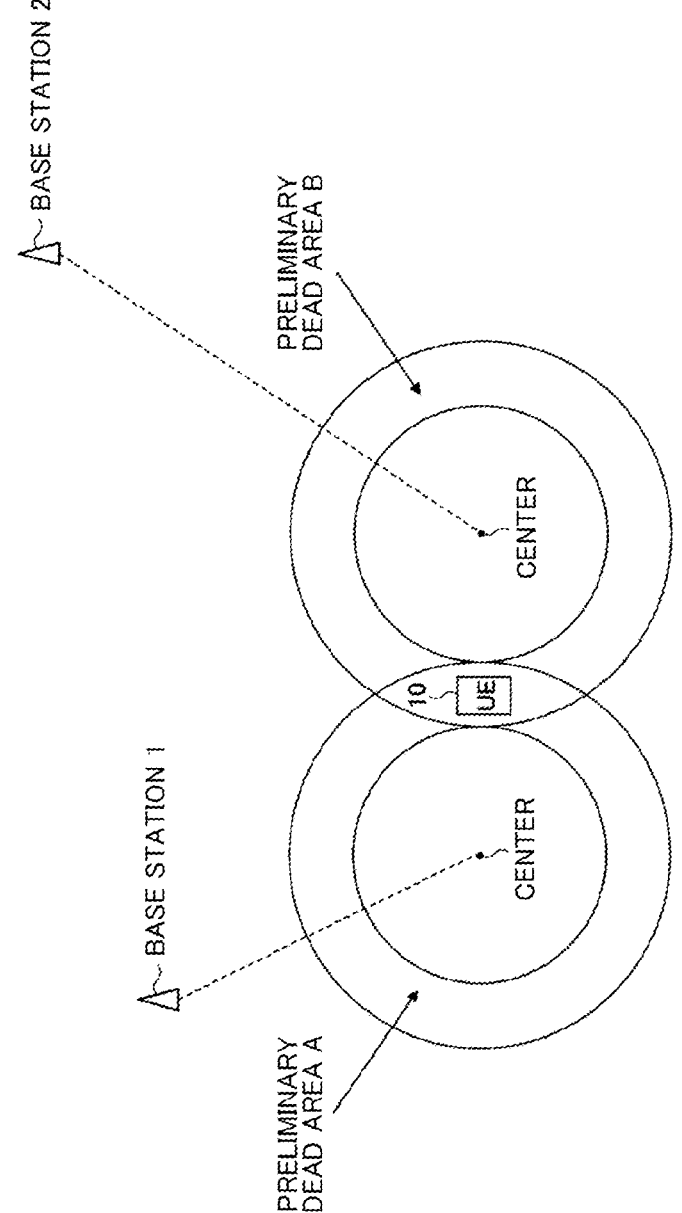
FIG. 8 is a diagram illustrating processing when preliminary dead zones overlap.

In a case where the switching control in which the number of connection destination base stations is one is performed, for example, as illustrated in FIG. 8, if the UE 10 is located in the preliminary dead area A with respect to the base station 1 and the preliminary dead area B with respect to the base station 2, the control device 100 connects the UE 10 to the base station 2 such that the distance from the center is large.

(Method of Calculating Dead Zone)

Next, a method of calculating a dead zone will be described. In the present embodiment, the control device 100 is assumed to perform dead zone calculation processing, but this is an example. A device other than the control device 100 may perform dead zone calculation processing, and the control device 100 may receive information regarding a dead zone from that device.

Figure 9:
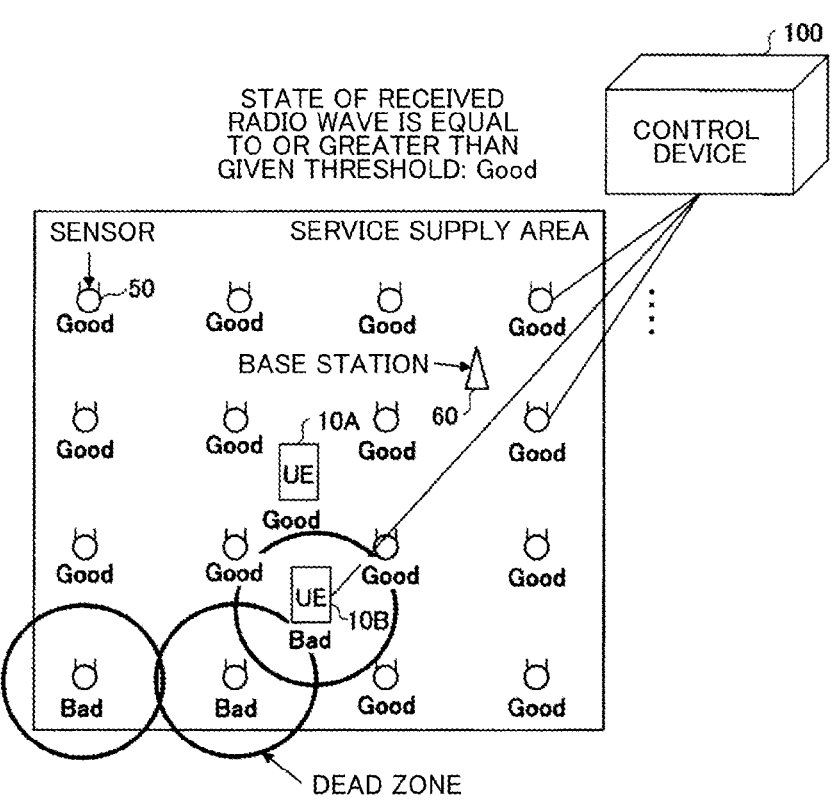
FIG. 9 is a diagram illustrating a method of calculating a dead zone.

In the present embodiment, as illustrated in FIG. 9, a plurality of sensors 50 are deployed inside a service supply area. The service supply area is a service supply area of a base station. FIG. 9 illustrates, as an example, a service supply area of a base station 60.

Each sensor 50 has a function of measuring reception quality and feeding a measurement result back to the control device 100. Each UE (in FIG. 9, UE 10A and UE 10B are illustrated) also has a function of measuring reception quality and feeding a measurement result back to the control device 100.

The sensor 50 and the base stations 60 may be wirelessly connected or connected by wire. When the sensor 50 and the base station 60 are wirelessly connected, each sensor 50 has a function of communicating with a base station similar to the UE 10 and can transmit a feedback signal to the base station 60 by using a user data region or a control message through allocation from the base station 60.

Figure 10:
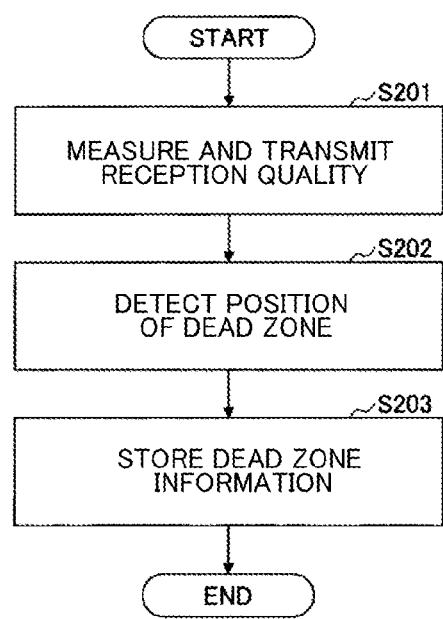
FIG. 10 is a flowchart illustrating a method of calculating a dead zone.

Next, a procedure example of dead zone calculation will be described with reference to the flowchart of FIG. 10. As an assumption of the processing illustrated in FIG. 10, it is assumed that the control device 100 already retains location information of each sensor 50. The processing illustrated in FIG. 10 is performed for each base station. In other words, information regarding the dead zone is obtained for each base station. The processing illustrated in FIG. 10 is executed periodically. That is, the information regarding the dead zone is updated periodically.

<S201>

In S201, each sensor 50 measures reception quality (received radio wave information) and transmits the measured reception quality to the control device 100. Each UE 10 transmits own location information and the reception quality to the control device 100.

The reception quality is, for example, one of SS-RSRP, CSI-RSRP, NR-RSSI, CSI-RSSI, SS-RSRQ, CSI-RSRQ, SS-SINR, and CSI-SINR or any combination thereof. In the transmission of the reception quality, uplink communication of a target radio system may be used, or another access means such as wired connection or a wireless LAN may be used.

<S202>

In S202, the control device 100 determines a position at which the dead zone is detected based on the received reception quality and the location information associated with the sensor 50 that is the transmission source of the reception quality.

For example, when the reception quality received from a sensor located at a certain position is greater than or equal to a predetermined threshold, the control device 100 determines that a state of the received radio waves at the position is good. When the reception quality is less than the predetermined threshold, the control device 100 determines that the state of the received radio waves at that position is bad.

The control device 100 determines the position at which the state of the received radio waves is determined to be bad as the position of the dead zone. The position is assumed to be a two-dimensional position such as x-y coordinates, longitude and latitude, or the like. However, when an indoor facility or the like is a target, the height direction (z-axis direction) may be added to set a 3-dimensional position as a target. In the case of 3 dimensions, the dead zone has a three-dimensional shape (for example, a ball).
<S203>

In S203, the control device 100 determines a range of the radius R centered at the position at which the dead zone is detected as the dead zone and stores information regarding the dead zone (for example, a radius and a center position) in a DB. R is a value which is defined in advance. The foregoing setting of the dead zone is an example.

FIG. 11 is a diagram illustrating an example of information regarding dead zones stored in the DB. In the example illustrated in FIG. 11, information regarding a position and a dead zone is stored for each detected dead point. In FIG. 11, for example, (p-R~p+R, q-R~q+R) means a circle with the radius R centered at (p, q).

Example of Device Configuration of Control Device and Example of Operation

Figure 12:
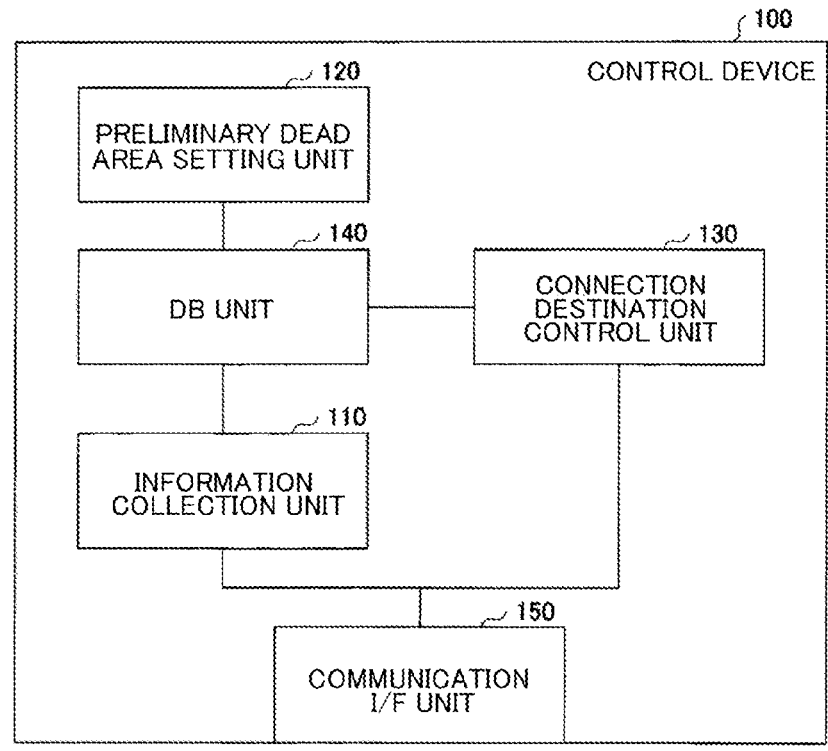
FIG. 12 is a diagram illustrating a functional configuration of a control device 100.

Next, an example of the configuration of the control device 100 for performing the above-described processing will be described. FIG. 12 is a diagram illustrating an example of a configuration of the control device 100. As illustrated in FIG. 12, the control device 100 includes an information collection unit 110, a preliminary dead area setting unit 120, a connection destination control unit 130, a DB unit 140, and a communication I/F unit 150.

The information collection unit 110 collects UE information (a position, a velocity, intensity of a radio wave received from a base station, atmospheric pressure information, and the like). When the control device 100 is to calculate a dead zone, the information collection unit 110 collects reception quality from the sensor 50 and the UE 10 and calculates the dead zone. When the control device 100 is not to calculate the dead zone, the information collection unit 110 receives information regarding the calculated dead zone from another device.

The preliminary dead area setting unit 120 sets a preliminary dead area around each dead zone. A setting method has been described above. The connection destination control unit 130 determines whether the UE 10 has entered the preliminary dead area by comparing the position of the UE 10 with the preliminary dead area. The connection destination control unit 130 performs connection destination control on the UE 10 when the connection destination control unit 130 determines that the UE 10 has entered the preliminary dead area.

The DB unit 140 has a DB (for example, see FIG. 11) that stores the information collected by the information collection unit 110 and the calculated information. The communication I/F unit 150 transmits and receives data.

Figure 13:
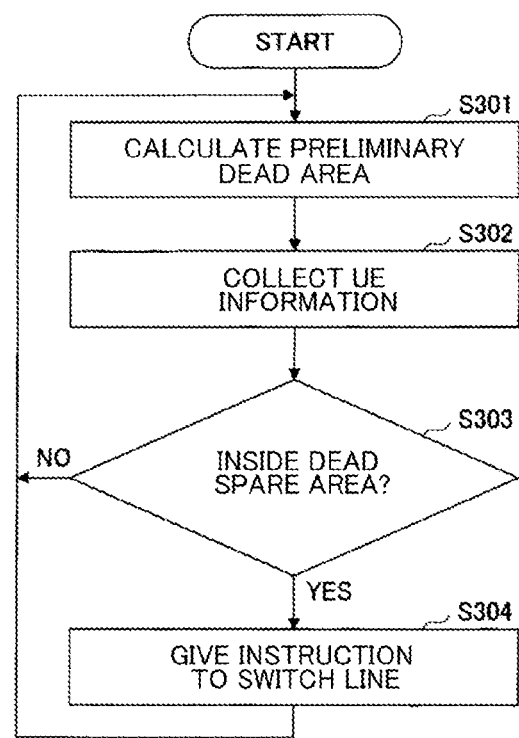
FIG. 13 is a flowchart illustrating an operation of the control device 100.

Next, an example of an operation of the control device 100 provided with the above-described configuration will be described with reference to the flowchart in FIG. 13. In the flow of FIG. 13, it is assumed that the dead zone information has already been stored in the DB unit 140.

In S301, a preliminary dead area setting unit 120 calculates a preliminary dead area for a base station to which the UE 10 is connected and each base station in the periphery to which the UE 10 can be connected. The information of the calculated preliminary dead area is stored in a DB unit 140.

In S302, an information collection unit 110 collects information regarding a UE (position, velocity, radio wave intensity from a base station, atmospheric pressure information or the like) from the UE 10. The collected information is stored in a DB unit 140.

In S303, the connection destination control unit 130 reads the location information of the UE 10 and the information regarding the preliminary dead area from the DB unit 140. The connection destination control unit 130 determines whether the UE 10 is located inside the preliminary dead area of the connection base station.

When a determination result of S303 is Yes, the processing proceeds to S304. The connection destination control unit 130 transmits an instruction to switch a connection line of the UE 10 (or form a redundancy configuration) to the UE 10 (or the base station of the connection destination). When the determination result of step S303 is No, processing returns to step S301.

Modified Examples

In the above-described example, the control device 100 determines whether the UE 10 enters the preliminary dead area and gives the instruction to switch the line, but this is an example. The UE 10 may determine the entry into the preliminary dead area and perform the line switching. The UE that determines the entry into the preliminary dead area and performs the line switching may be referred to as a "control device."

Figure 14:
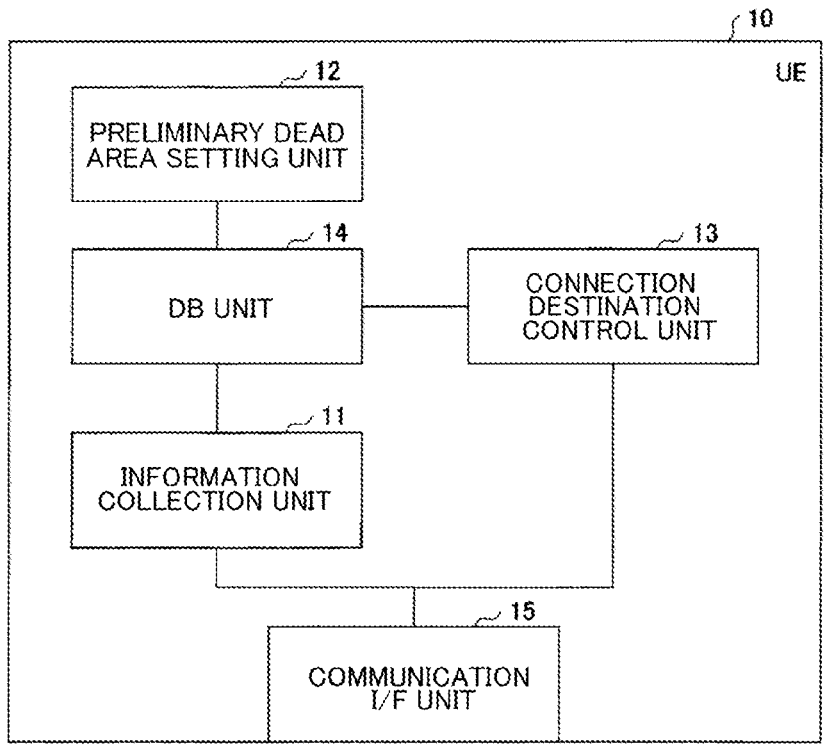
FIG. 14 is a diagram illustrating a functional configuration of a UE 10.

FIG. 14 illustrates an example of the configuration of the UE 10 in a case where the UE 10 determines the entry into the preliminary dead area and performs the line switching. As illustrated in FIG. 14, the configuration of the UE 10 is the same as that of the control device 100. That is, as illustrated in FIG. 14, the UE 10 includes an information collection unit 11, a preliminary dead area setting unit 12, a connection destination control unit 13, a DB unit 14, and a communication I/F unit 15. The functions of the units are the same as those of the corresponding functional units of the control device 100 as follows.

The information collection unit 11 includes, for example, a position sensor such as GPS, a speed sensor, and an acceleration sensor and collect UE information regarding the UE 10 (a position, a velocity, intensity of a radio wave from a base station, atmospheric pressure information, and the like). When the UE 10 is to calculate a dead zone, the information collection unit 11 collects reception quality from the sensor 50 and other UEs 10 and calculates the dead zone. When the UE 10 is not to calculate the dead zone, the information collection unit 11 receives information regarding the calculated dead zone from another device.

The preliminary dead area setting unit 12 sets a preliminary dead area around each dead zone. A setting method has been described above. The connection destination control unit 13 determines whether the UE 10 has entered the preliminary dead area by comparing the position of the UE 10 with the preliminary dead area. The connection destination control unit 13 performs connection destination control of the UE 10 when the connection destination control unit 13 determines that the UE 10 has entered the preliminary dead area. For example, a base station which is the connection destination of the UE 10 is switched from the connection destination base station to another base station. Furthermore, the connection destination control unit 13 may instruct the connection base station and the wireless LAN-AP to switch the connection.

The DB unit 14 includes a DB (for example, see FIG. 11) that stores information collected or calculated by the information collection unit 11. The communication I/F unit 15 transmits and receives data. An operation of the UE 10 in the modified example is the same as that of the control device 100 illustrated in FIG. 13.

Hardware Configuration Example

The control device 100 and the UE 10 in the present embodiment (including the modified examples) can be implemented, for example, by causing a computer to execute a program describing processing content described in the present embodiment. The "computer" used as the control device 100 may be a physical machine or a virtual machine on a cloud. When a virtual machine is used, "hardware" described here is virtual hardware.

The above-described program can be recorded on a computer-readable recording medium (a portable memory or the like), and the program may be stored, or distributed. It is also possible to provide the program via a network such as the Internet or an electronic mail.

Figure 15:
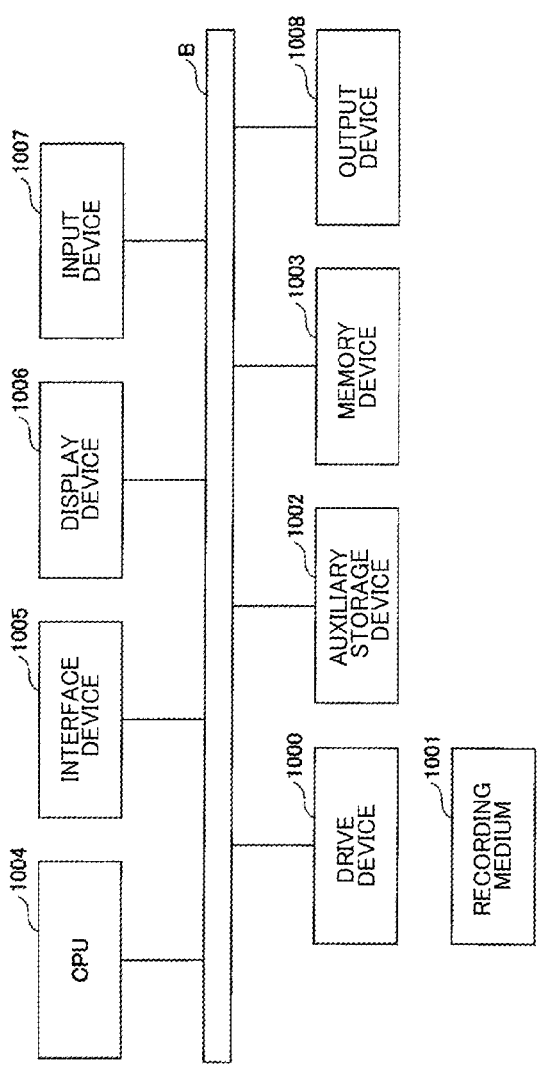
FIG. 15 is a diagram illustrating an exemplary hardware configuration of a device.

FIG. 15 is a diagram illustrating an exemplary hardware configuration of the computer. The computer in FIG. 15 includes a drive device 1000, an auxiliary storage device 1002, a memory device 1003, a CPU 1004, an interface device 1005, a display device 1006, an input device 1007, and an output device 1008, which are connected to each other by a bus BS.

A program for implementing processing in the computer is provided by, for example, a recording medium 1001 such as a CD-ROM or a memory card. When the recording medium 1001 storing the program is set in the drive device 1000, the program is installed in the auxiliary storage device 1002 from the recording medium 1001 via the drive device 1000. Here, it is not necessary to install the program from the recording medium 1001. The program may be downloaded from another computer via a network. The auxiliary storage device 1002 stores the installed program and also stores necessary files, data, and the like.

The memory device 1003 reads and stores the program from the auxiliary storage device 1002 when there is an instruction to start the program. The CPU 1004 implements functions related to the control device 100 or the UE 10 in accordance with the program stored in the memory device 1003. The interface device 1005 is used as an interface for connection to a network and functions as a transmission unit and a reception unit. The display device 1006 displays a graphical user interface (GUI) or the like according to a program. The input device 1007 is configured with a keyboard, a mouse, a button, a touch panel, or the like, and is used to input various operation instructions. The output device 1008 outputs a calculation result.

Effects of Embodiment

According to the technology of the present embodiment described above, it is possible to perform redundancy through switching to another line or connection of a plurality of lines before entry of the UE 10 into the dead zone, and it is possible to avoid deterioration in communication quality and instantaneous interruption.

Conclusion of Embodiments

In the present specification, at least a communication system, a connection destination control method, a control device, and a program described in each clause are described.

(Clause 1)

A communication system including:

a terminal configured to wirelessly communicate with a base station: and a control device, wherein the terminal includes a transmission unit that transmits location information of the terminal, and wherein the control device includes:

a preliminary dead area setting unit that sets an area around a dead zone as a preliminary dead area, an information collection unit that acquires location information of the terminal, and a connection destination control unit that determines whether the terminal is in the preliminary dead area by comparing the location information of the terminal with the preliminary dead area and performs control for switching a connection destination of the terminal when the connection destination control unit determines that the terminal is in the preliminary dead area.

(Clause 2)

The communication system according to Clause 1, wherein, when the terminal is in a plurality of preliminary dead areas, the connection destination control unit selects, from among base stations corresponding to the plurality of preliminary dead areas, a base station such that a distance from the dead zone is largest, as a connection destination of the terminal.

(Clause 3)

The communication system according to Clause 1 or 2, wherein the information collection unit calculates the dead zone based on reception quality received from a plurality of sensors.

(Clause 4)

A connection destination control method in a communication system including a terminal that wirelessly communicates with a base station and a control device, wherein the terminal transmits location information of the terminal, and wherein the control device sets an area around a dead zone as a preliminary dead area, acquires location information of the terminal, and determines whether the terminal is in the preliminary dead area by comparing the location information of the terminal with the preliminary dead area and performs control for switching a connection destination of the terminal when the connection destination control unit determines that the terminal is in the preliminary dead area.

(Clause 5)

A control device in a communication system including a terminal that wirelessly communicates with a base station and a control device, the control device comprising:

a preliminary dead area setting unit configured to set an area around a dead zone as a preliminary dead area;

an information collection unit configured to acquire location information of the terminal, and a connection destination control unit configured to determine whether the terminal is in the preliminary dead area by comparing the location information of the terminal with the preliminary dead area and perform control for switching a connection destination of the terminal when the connection destination control unit determines that the terminal is in the preliminary dead area.

(Clause 6)

The control device according to Clause 5, wherein, when the terminal is in a plurality of preliminary dead areas, the connection destination control unit selects, from among base stations corresponding to the plurality of preliminary dead areas, a base station such that a distance from the dead zone is largest, as a connection destination of the terminal.

(Clause 7)

The control device according to Clause 5 or 6, wherein the information collection unit calculates the dead zone based on reception quality received from a plurality of sensors.

(Clause 8)

A program causing a computer to function as each unit of the control device according to any one of Clauses 5 to 7.

The embodiments are described above, but the present invention is not limited to such specific embodiments, and various modifications and alternations can be made within the scope of the gist of the present invention described in the claims.

REFERENCE SIGNS LIST

10 Terminal (UE)
11 Information collection unit
12 Preliminary dead area setting unit
13 Connection destination control unit
14 DB unit
15 Communication I/F unit
50 Sensor
60, 220.320, 430 Base station
100 Control device
110 Information collection unit
120 Preliminary dead area setting unit
130 Connection destination control unit
140 DB unit
150 Communication I/F unit
200, 300 Carrier network
210 LTE core network
310, 420 5G core network
400 L5G service provider network
500 Internet
410 Aggregate SW
440 Wireless LAN-AP
1000 Drive device
1001 Recording medium
1002 Auxiliary storage device
1003 Memory device
1004 CPU
1005 Interface device
1006 Display device
1007 Input device
1008 Output device

The invention claimed is:

1. A communication system comprising:
a terminal configured to wirelessly communicate with a base station; and
a control device,
wherein the terminal includes a transmitter that transmits location information of the terminal, and
wherein the control device includes:
a processor; and
a memory that includes instructions, which when executed, cause the processor to execute the following steps:

setting an area around a dead zone as a preliminary dead area, wherein the preliminary dead area has a predetermined radius larger than a radius of the dead zone,
acquiring location information of the terminal, and
determining whether the terminal is in the preliminary dead area by comparing the location information of the terminal with the preliminary dead area and performing control for switching a connection destination of the terminal when the determining determines that the terminal is in the preliminary dead area.

2. The communication system according to claim 1, wherein, when the terminal is in a plurality of preliminary dead areas, the processor selects, from among base stations corresponding to the plurality of preliminary dead areas, a base station such that a distance from the dead zone is largest, as a connection destination of the terminal.

3. The communication system according to claim 1, wherein the processor calculates the dead zone based on reception quality received from a plurality of sensors.

4. A connection destination control method in a communication system including a terminal that wirelessly communicates with a base station and a control device, the method comprising:
transmitting, by the terminal, location information of the terminal;
setting, by the control device, an area around a dead zone as a preliminary dead area, wherein the preliminary dead area has a predetermined radius larger than a radius of the dead zone;
acquiring, by the control device, location information of the terminal;
determining, by the control device, whether the terminal is in the preliminary dead area by comparing the location information of the terminal with the preliminary dead area; and
performing, by the control device, control for switching a connection destination of the terminal in response to determining that the terminal is in the preliminary dead area.

5. A control device in a communication system including a terminal that wirelessly communicates with a base station and a control device, the control device comprising:
a processor; and
a memory that includes instructions, which when executed, cause the processor to execute the following steps:
setting an area around a dead zone as a preliminary dead area, wherein the preliminary dead area has a predetermined radius larger than a radius of the dead zone;
acquiring location information of the terminal, and
determining whether the terminal is in the preliminary dead area by comparing the location information of the terminal with the preliminary dead area and performing control for switching a connection destination of the terminal when the determining determines that the terminal is in the preliminary dead area.

6. The control device according to claim 5, wherein, when the terminal is in a plurality of preliminary dead areas, the processor selects, from among base stations corresponding to the plurality of preliminary dead areas, a base station such that a distance from the dead zone is largest, as a connection destination of the terminal.

7. The control device according to claim 5, wherein the processor calculates the dead zone based on reception quality received from a plurality of sensors.

8. A non-transitory computer readable storage medium storing a program, which when executed, causing a computer to function as the control device according to claim 5.

*     *     *     *     *